(12) United States Patent
van der Vliet et al.

(10) Patent No.: US 6,853,793 B1
(45) Date of Patent: Feb. 8, 2005

(54) ATTENUATOR HAVING REDUCED OPTICAL LOSS IN THE PASS MODE

(75) Inventors: Frederik Marcel van der Vliet, Pasadena, CA (US); Dazeng Feng, Arcadia, CA (US)

(73) Assignee: Kotura, Inc., Monterey Park, CA (US)

(*) Notice: Subject to any disclaimer, the term of this patent is extended or adjusted under 35 U.S.C. 154(b) by 80 days.

(21) Appl. No.: 10/371,642

(22) Filed: Feb. 21, 2003

(51) Int. Cl.$^7$ .............................. G02B 6/00; G02B 6/16; H01L 21/00; H01J 3/14

(52) U.S. Cl. ..................... 385/130; 438/22; 385/140; 385/147; 385/11; 250/216

(58) Field of Search ................................. 385/1, 2, 3, 8, 385/9, 11, 14, 40, 125–131; 257/192, 194; 438/669, 689, 22; 430/221; 356/477; 250/216; 359/196, 321

(56) References Cited

U.S. PATENT DOCUMENTS

| | | | |
|---|---|---|---|
| 5,710,847 A | 1/1998 | Takano et al. | |
| 6,374,001 B1 | 4/2002 | Bozeat et al. | |
| 6,608,945 B2 * | 8/2003 | Deliwala | 385/2 |
| 2002/0126939 A1 | 9/2002 | House et al. | |
| 2002/0126976 A1 | 9/2002 | Day | |
| 2003/0025070 A1 * | 2/2003 | Deliwala | 250/216 |
| 2003/0031394 A1 * | 2/2003 | Deliwala | 385/11 |
| 2003/0032286 A1 * | 2/2003 | Deliwala et al. | 438/689 |
| 2003/0035265 A1 * | 2/2003 | DeLuga | 361/683 |
| 2003/0036266 A1 * | 2/2003 | Deliwala | 438/689 |
| 2003/0039430 A1 * | 2/2003 | Deliwala | 385/14 |
| 2003/0039439 A1 * | 2/2003 | Deliwala | 385/30 |
| 2003/0040134 A1 * | 2/2003 | Deliwala | 438/22 |
| 2003/0040175 A1 * | 2/2003 | Deliwala | 438/669 |
| 2003/0054639 A1 * | 3/2003 | Deliwala | 438/689 |
| 2004/0129949 A1 * | 7/2004 | Deliwala et al. | 257/194 |

FOREIGN PATENT DOCUMENTS

| | | |
|---|---|---|
| JP | 08049897 | 2/1996 |
| WO | WO 98/43128 | 1/1998 |

OTHER PUBLICATIONS

Day, I.E., et al., *Solid State Absorption Attenuator in Silicon–on–Insulator with MHz Bandwidth*, integrated Photonics Research Conference, May 2002, pp 1–3.

Kasahara, R. et al., *Low Power Consumption Silica–Based 2+2 Thermooptic Switch Using Trenched Silicon Substrate*, IEEE Photonics Technology Letters, vol. 11, No. 9, Sep. 1999, pp. 1132–1134.

* cited by examiner

*Primary Examiner*—Akm Enayet Ullah
(74) *Attorney, Agent, or Firm*—Garrilovich, Dodd & Lindsey, LLP

(57) ABSTRACT

An optical device includes a ridge waveguide defined by a ridge extending from a slab of a light transmitting medium. The optical device also includes trenches extending into the slab of light transmitting medium on opposing sides of the ridge. At least one of the trenches is associated with a trench displacement that tapers from a first displacement to a second displacement. The trench displacement is the distance between the ridge and the side of a trench closest to the ridge. The optical device also includes at least one electrical contact positioned in at least one of the trenches.

27 Claims, 5 Drawing Sheets

ATTENUATOR HAVING REDUCED OPTICAL LOSS IN THE PASS MODE

BACKGROUND

1. Field of the Invention

The invention relates to optical devices. In particular, the invention relates to optical attenuators.

2. Background of the Invention

A variety of optical devices employ optical attenuators to reduce the intensity of light signals carried within the optical device. These optical devices can employ ridge waveguides to confine light signals to particular regions of the optical device. A ridge waveguide is generally defined by a ridge extending from a slab of light transmitting medium.

Attenuators used in conjunction with ridge waveguides often employ free carrier absorption to achieve attenuation. These attenuators typically include doped regions positioned on opposing sides of a ridge waveguide. Electrical energy is applied to the doped region to inject free carriers into the waveguide.

These attenuators can employ trenches extending into the slab region on opposing sides of a ridge waveguide. The doped regions extend from the bottom of the trenches to the base. This structure serves to constrain the injected carriers between the doped regions and accordingly increases the efficiency of the attenuator.

The trenches can interact with light signals traveling along a ridge waveguide. For instance, the trenches can reflect or scatter a light signal entering the region between trenches. Further, the trenches can make the waveguide a multimode waveguide that excites higher order modes. The higher order modes can interfere with the fundamental mode and serve as a source of wavelength dependent loss. As a result, the trenches can be a source of optical loss and a source of wavelength dependent loss. There is a need for a high efficiency attenuator associated with reduced optical loss when operated in the pass mode.

SUMMARY OF THE INVENTION

The invention relates to an optical device having an attenuator. The optical device includes a ridge waveguide defined by a ridge extending from a slab of a light transmitting medium. The optical device also includes trenches extending into the slab of light transmitting medium on opposing sides of the ridge. At least one of the trenches is associated with a trench displacement that tapers from a first displacement to a second displacement. The trench displacement is the distance between the ridge and the side of a trench closest to the ridge. The optical device also includes at least one electrical contact positioned in at least one of the trenches. In some instances, each of the trenches is associated with a trench displacement that tapers from a first displacement to a second displacement.

The trench displacement can taper from an end of the trench down to a second displacement. The trench displacement at the end of the trench can be greater than greater than 2 μm, 6 μm or 10 μm. In some instances, a ratio of the trench displacement at the end of the trench to the second trench displacement is greater than 1.05, 1.25 or 1.35.

In some instances, the second displacement remains constant for a length of the trench. The electrical contacts can be positioned along the length of the trench having the constant trench displacement.

Another embodiment of the optical device includes a ridge waveguide defined by a ridge extending from a slab of a light transmitting medium. The device also includes trenches extending into the slab of light transmitting medium on opposing sides of the ridge. The device further includes a plurality of electrical contacts positioned in each trench.

The invention also relates to a method of forming an optical device having an attenuator. The method includes forming a ridge extending from a slab of a light transmitting medium. The ridge is formed so as to serve as a ridge waveguide. The method also includes forming trenches extending into the slab of light transmitting medium on opposing sides of the ridge. At least one of the trenches is associated with a trench displacement that tapers from a first displacement to a second displacement. The method also includes forming at least one electrical contact in at least one of the trenches.

Another embodiment of the method includes forming a ridge extending from a slab of a light transmitting medium. The ridge is formed so as to serve as a waveguide. The method also includes forming trenches extending into the slab of light transmitting medium on opposing sides of the ridge and forming a plurality of electrical contacts in each trench.

DETAILED DESCRIPTION

The invention relates to an optical device having an attenuator. The optical device includes a ridge waveguide defined by a ridge extending from a slab of a light transmitting medium. The optical device also includes trenches extending into the slab of light transmitting medium on opposing sides of the ridge. Doped regions extend from the bottom of the trenches toward the base. Electrical energy can be applied to the doped regions to inject free carriers into the light transmitting medium between the doped regions. Free carrier absorption provides the optical attenuation. The proximity of the doped regions to the base constrains the free carriers to the region between the doped regions and accordingly increases the efficiency of the attenuator.

The trenches can be constructed such that that ends of the trench flare away from the waveguide. The flared ends can serve to slow the compression of a light signal entering the region between the trenches. The slow compression of the light signal can reduce the reflection and/or scattering of the light signal. Further, the slow compression can reduce excitation of higher order modes. Hence, the flared ends of the trenches can reduce the optical loss and wavelength dependent loss associated with the attenuator when the attenuator is operated in the pass mode. Additionally, the flared ends can serve to slow the expansion of a light signal exiting the region between the trenches. As a result, the flared ends can further reduce reflection and scattering.

In some instances, a plurality of attenuators are positioned so as to attenuate a light signal traveling along a waveguide. Each attenuator includes electrical contacts and doped regions positioned on opposing sides of the waveguide. Electrical contacts and doped regions for different attenuators can be positioned in the same trench. Placing a plurality of electrical contacts in a single trench reduces the number of trenches with which the light signal interacts while traveling along the waveugide and accordingly reduces the optical loss associated with operating the attenuators in the pass mode.

Figure 1A:
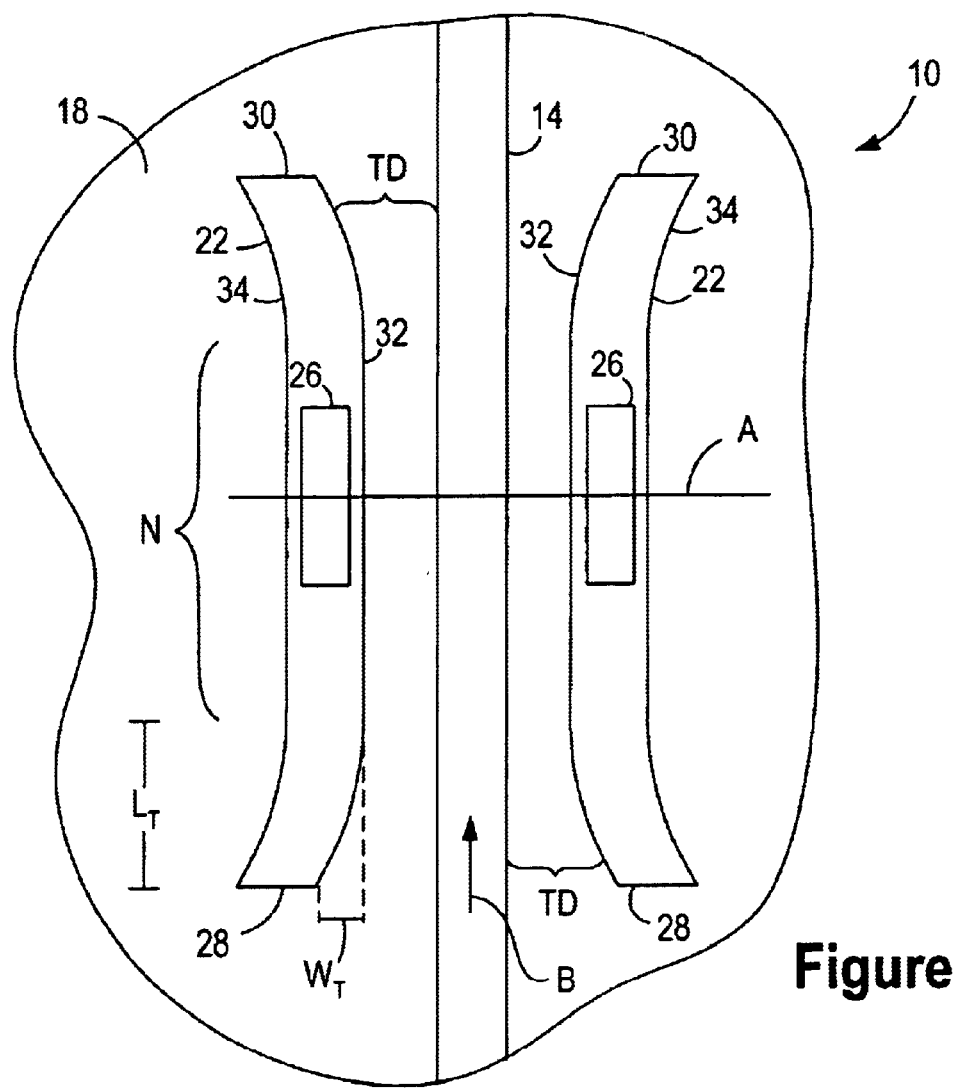
FIG. 1A is a topview of an optical device having an optical attenuator. The optical device includes trenches positioned on opposing sides of a ridge waveguide. The end of the trenches flares away from the ridge waveguide.
Figure 1B:
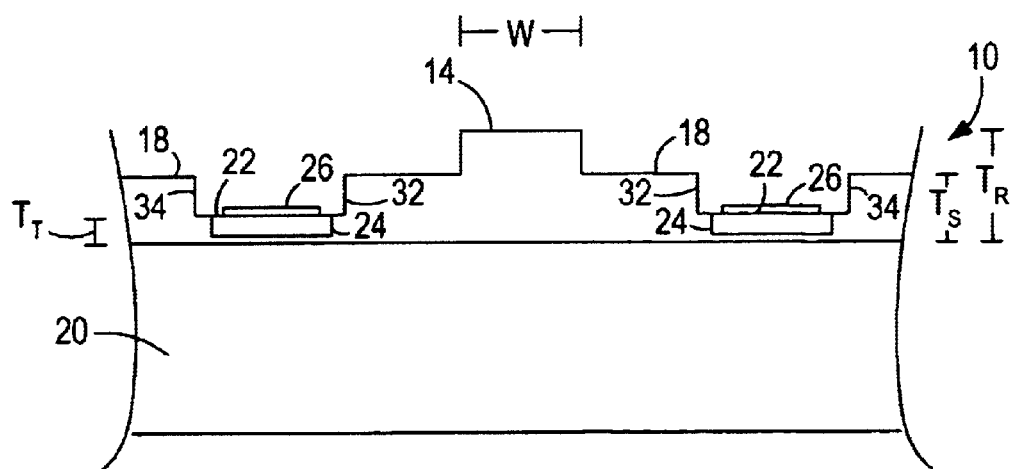
FIG. 1B is a cross section of the optical device shown in FIG. 1A taken along the line labeled A.

FIG. 1A is a topview of an optical device 10 having an optical attenuator. FIG. 1B is a cross section of the optical device 10 shown in FIG. 1A taken along the line labeled A. The optical attenuator is positioned so as to attenuate light signals traveling along a ridge waveguide 14. The waveguide 14 is defined by a ridge extending from a slab 18 of light transmitting medium positioned on a base 20. Suitable light transmitting media include, but are not limited to, silicon, polymers, silica, SIN, GaAs, InP and LiNbO$_3$. The portion of the base 20 adjacent to the light transmitting medium constrains the light signals within the waveguide 14. A suitable base 20 for use with a silicon light transmitting medium, includes but is not limited to, a layer of silica over a silicon substrate as is present on a silicon-on-insulator wafer. The line labeled E in FIG. 1C illustrates the mode profile of a light signal carried in the waveguide 14.

The ridge has a width labeled W. The ridge has a thickness labeled $T_R$ and the slab has a thickness labeled $T_S$. These values are often interdependent and can depend on the single mode waveguide, guiding of the fundamental mode and production tolerances. A suitable width, W, for the ridge includes, but is not limited to widths greater than 0.2 $\mu$m or 1 $\mu$m and/or less than 8 $\mu$m or 14 $\mu$m. A suitable ridge thickness, $T_R$, includes, but is not limited to a thickness greater than 0.2 $\mu$m or 1 $\mu$m and/or less than 8 $\mu$m or 14 $\mu$m. A suitable slab thickness, $T_S$, includes, but is not limited to a thickness greater than 0.1 $\mu$m or 1 $\mu$m and/or less than 7 $\mu$m or 13 $\mu$m. In one example, the ridge width is about 3.2 $\mu$m, $T_R$ is about 3.8 $\mu$m, and $T_S$ is about 2.3 $\mu$m.

Trenches 22 extend into the slab 18 on opposing sides of the waveguide 14. The thickness of the trench bottom is labeled $T_T$. Reducing the thickness of the trench bottom, $T_T$, can increase the efficiency of the attenuation. A suitable trench bottom thickness, $T_T$, includes, but is not limited to a thickness less than 2 $\mu$m, less than 1 $\mu$m, less than 1 $\mu$m or less than 0.2 $\mu$m. In some instances, reducing the trench thickness can increase the attenuation efficiency.

A doped region 24 is formed on the bottom of each trench 22. One of the doped regions 24 includes a P-type material and one of the doped regions 24 includes an N-type material. An electrical contact 26 is formed on each doped region 24. Although the electrical contacts 26 are shown extending part way across the bottom of the trench 22 the electrical contacts 26 can extend across the entire bottom of the trench 22. Additionally, the electrical contacts 26 can extend up the sides of the trench 22. Electrical energy can be applied to the electrical contacts 26 so as to inject carriers into the waveguide 14. Free carrier absorption provides optical attenuation.

Although the doped regions 24 are shown extending part way through the light transmitting medium, the doped regions 24 can extend through the light transmitting medium to the base 20. Extending the doped regions 24 further toward the base 20 can increase the efficiency of the attenuator by constraining additional carriers between the doped regions 24.

The direction of light signal travel through the waveguide 14 is illustrated by the arrow labeled B in FIG. 1A. The light signal passes a leading end 28 of each trench 22 before entering the region between the trenches 22 and passes a following end 30 of each trench 22 upon exiting the region between trenches 22.

The side of the trenches 22 nearest to the waveguide 14 is the active side 32 of the trench 22 and the side of the trench 22 furthest from the waveguide 14 is the inactive side 34 of the trench 22. The distance between the active side 32 of a trench 22 and the ridge of the waveguide 14 is the trench 22 displacement, TD. When the active side 32 of the trench 22 is not vertical, the trench 22 displacement is measured relative to the portion of the active side 32 closest to the ridge.

The trench 22 is constructed such that the trench 22 displacement, TD, tapers from the leading end 28 to a narrow region labeled N in FIG. 1A. The trench 22 displacement can be selected to provide a slow contraction of the light signal entering the region between trenches 22 as opposed to the abrupt contraction that would occur without the taper. As a result, the taper of the trench 22 displacement, TD, can reduce reflection or scattering of a light signal entering the region between trenches 22. Accordingly, the attenuator is associated with a reduced degree of optical loss when operated in the pass mode.

The trench 22 displacement is also shown expanding when moving from the narrow region toward the following end 30. The taper can be configured to provide a gradual expansion of the light signal as the light signal exits from the region between the trenches 22. Accordingly, the taper can reduce the excitement of higher order modes as the light signal exits the region between trenches 22. The expansion of trench 22 displacement when moving toward the following end 30 is optional.

A suitable trench 22 displacement for the narrow region includes, but is not limited to, trench 22 displacements greater than 0.1 $\mu$m, 2 $\mu$m and 6 $\mu$m and/or less than 10 $\mu$m, 15 $\mu$m and 30 $\mu$m. I some instances, the trench 22 displacement in the narrow region is about 7 $\mu$m–9 $\mu$m. The trench 22 displacement can expand from the narrow region to a trench 22 displacement greater than 2 $\mu$m and 7 $\mu$m. In some instances, the ratio of the trench 22 displacement at the leading end 28 to the trench 22 displacement at the narrow region is greater than 1.01, 1.1 or 1.3 and/or less than 2.0, or 1.5. In some instances, the ratio of the trench 22 displacement at the following end 30 to the trench 22 displacement at the narrow region is greater than 1.1 or 1.3 and/or less than 3.0, 2.0, or 1.5. In one example, the trench 22 displacement at the narrow region is about 8 $\mu$m and the ratio of the trench 22 displacement at the leading end 28 to the trench 22 displacement at the narrow region is about 1.4. The trench 22 displacement at the leading end 28 can be about the same as the trench 22 displacement at the following end 30 or can be different from the trench 22 displacement at the following end 30.

The length of one of the tapers is labeled $L_T$ in FIG. 1A. The change in the trench 22 displacement over the taper length ($L_T$) is labeled $W_T$ in FIG. 1A. A taper can be constructed so the ratio of $W_T$:$L_T$ is greater than 1:10,000 or 3:1,000 and/or less than 1:100, or 3:100. In some instances, the ratio of $W_T$:$L_T$ is between 1:500 and 6:500. In one example, the ratio of $W_T$:$L_T$ is about 3:500 and with a $W_T$ of about 3 µm.

The active side 32 is shown as being straight in the narrow region. The electrical contacts 26 and doped regions 24 are shown positioned adjacent to the straight length of the active side 32. This arrangement can enhance uniformity of the carrier injection along the length of the electrical contacts 26. However, the electrical contacts 26 and/or the doped regions 24 can be positioned adjacent to curved sections of the active side 32. In some instances, the active side 32 is arc shaped along its entire length and the active side 32 does not have a straight section. A trench 22 having an arc shaped active side 32 may be suitable for use with an attenuator positioned along a curved waveguide 14.

Figure 2A:
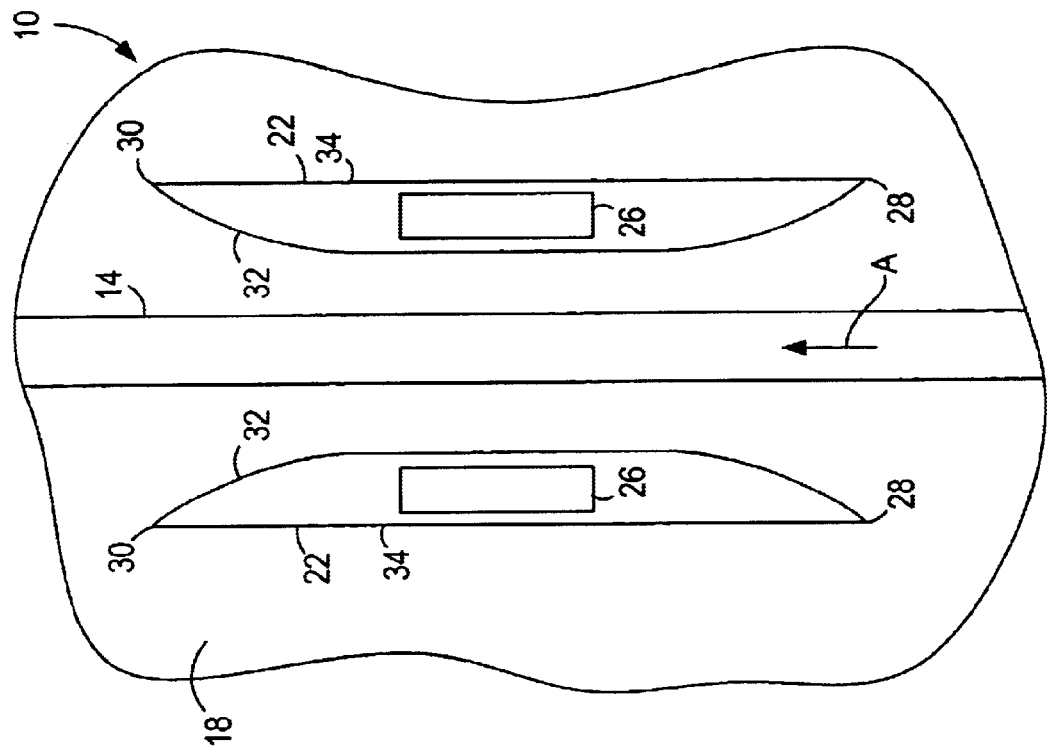
FIG. 2A is a topview of an optical device having an attenuator. The optical device includes trenches positioned on opposing sides of a ridge. The side of the trench closest to the ridge waveguide and the side of the trench furthest from the ridge waveguide connect at the end of the trench.
Figure 2B:
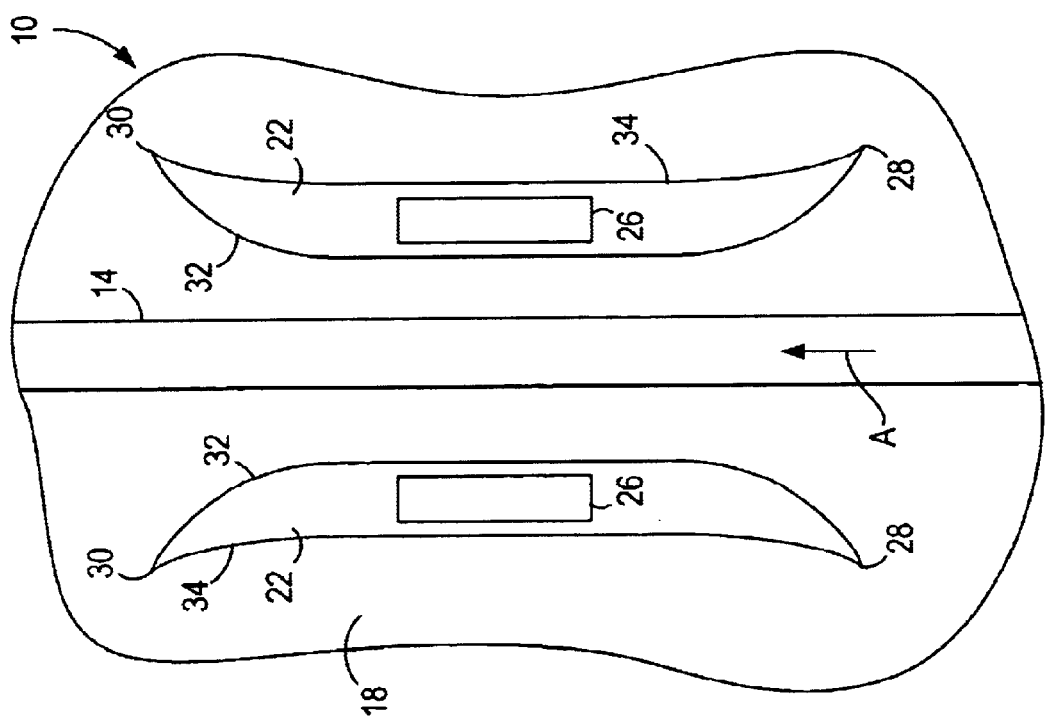
FIG. 2B is a topview of an optical device having an attenuator. The optical device includes trenches positioned on opposing sides of a ridge. The side of the trench furthest from the ridge waveguide is straight.

The trenches 22 need not include additional sides connecting the active side 32 and the inactive sides 34 as shown in FIG. 1A. FIG. 2A is an example of an optical device 10 where the active side 32 and inactive side 34 are connected at the ends of the trench 22. The inactive side 34 of the trench 22 need not include a curve. FIG. 2B is an example of an optical device 10 where the inactive side 34 is straight along the length of the inactive side 34.

Figure 3:
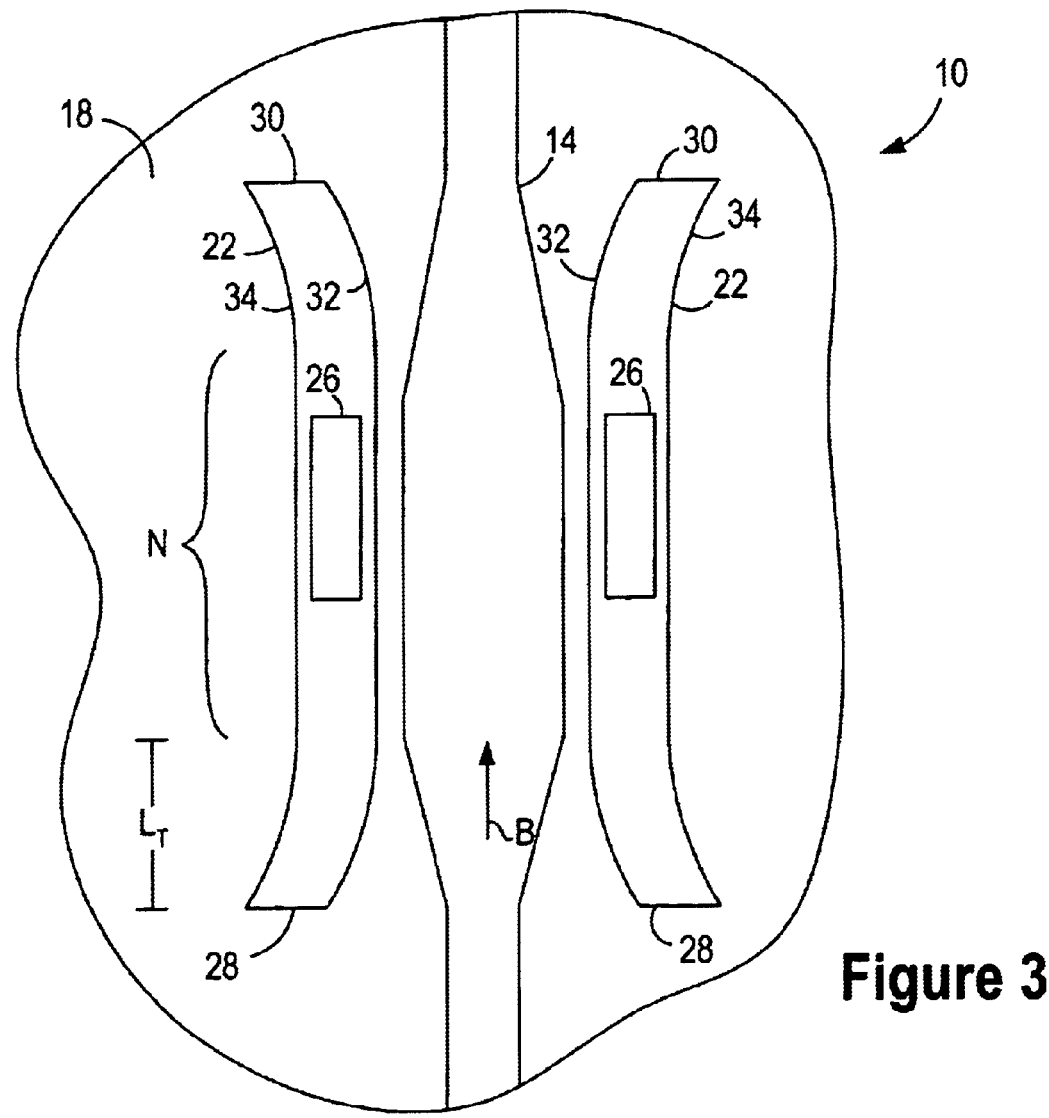
FIG. 3 is a topview of an optical device having an attenuator. The optical device includes trenches positioned on opposing sides of a ridge waveguide. The width of the waveguide flares outward before the waveguide passes between electrical contacts positioned in the trenches. The width of the waveguide tapers after the waveguide passes the electrical contacts.

The dimensions of the waveguide 14 can change in association with the waveguide 14 passing between the trenches 22. For instance, FIG. 3 illustrates a waveguide 14 having a width that changes as the waveguide 14 passes the between the trenches 22. For the purposes of simplifying discussion, the arrow labeled B illustrates the direction of a light signal traveling along the waveguide 14. The width of the waveguide 14 flares before the waveguide 14 passes between the narrow region labeled N in FIG. 3.

The increased width of the waveguide 14 can better confine the fundamental mode and can accordingly reduce the interaction between the fundamental mode and the doped regions (not shown). The reduced interaction between the fundamental mode and the doped regions allows the doped regions and the electrical contacts 26 to be positioned closer to the waveguide 14. The flare of the waveguide 14 preferably occurs before the waveguide 14 passes one or more doped regions and/or before the waveguide 14 passes one or more electrical contacts 26. Although the waveguide 14 flare is shown occurring before the waveguide 14 passes between the narrow region, all or a portion of the flare can occur within the narrow region. Further, all or a portion of the waveguide 14 flare can occur before the waveguide 14 passes between the trenches 22.

The waveguide 14 width can optionally taper after the waveguide 14 passes one or more doped regions as shown in FIG. 3. The taper can option return the dimensions of the waveguide 14 back to the dimensions of the waveguide 14 before the flare of the waveguide 14 width. Accordingly, the advantages of the original waveguide 14 dimensions can be retained outside of the trenches 22. The taper of the waveguide 14 width preferably occurs after the waveguide 14 passes one or more doped regions and/or after the waveguide 14 passes one or more electrical contacts 26. Although the waveguide 14 taper is shown occurring after the waveguide 14 passes the narrow region, all or a portion of the taper can occur within the narrow region. Further, all or a portion of the waveguide 14 taper can occur before the waveguide 14 passes between the trenches 22.

Figure 4:
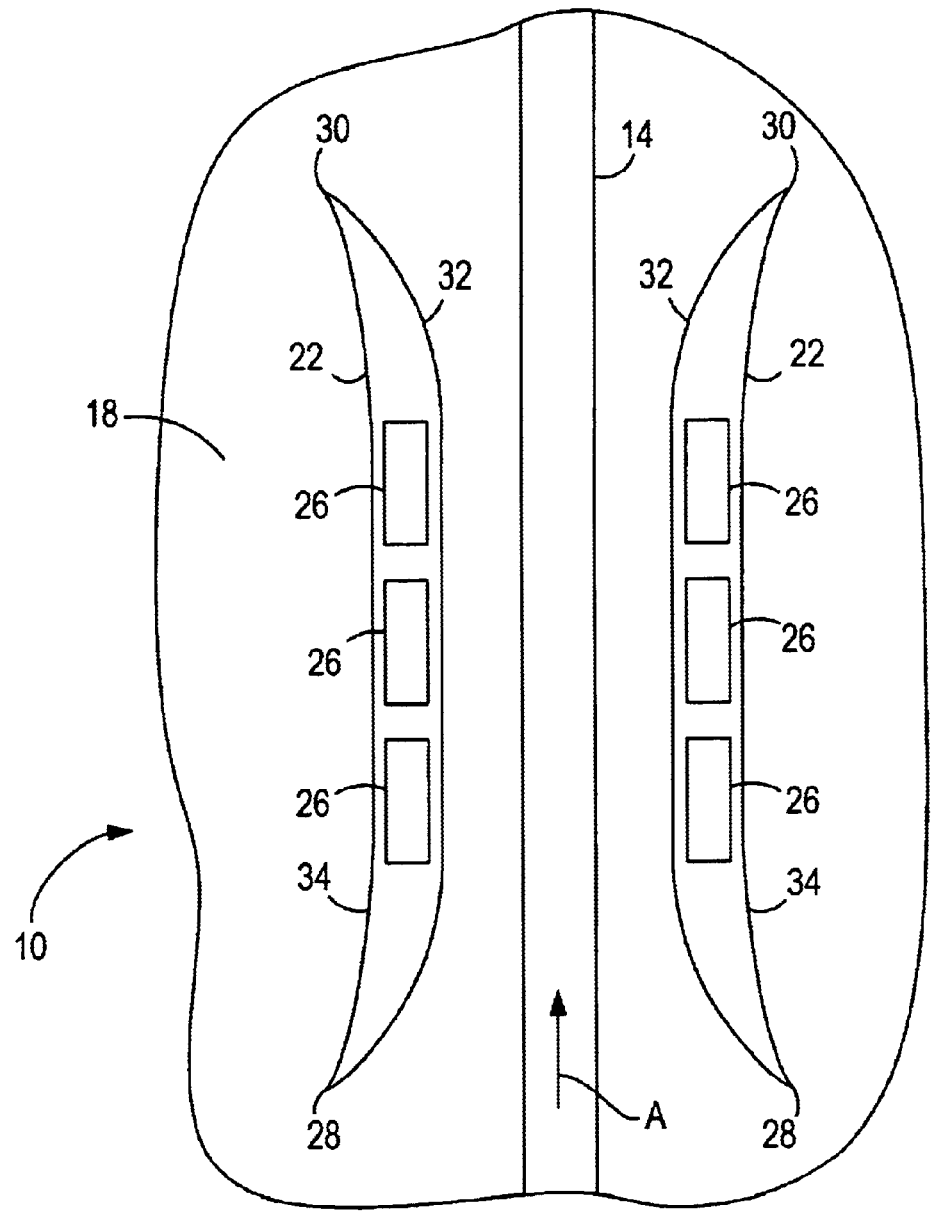
FIG. 4 is a topview of an optical device having an attenuator. The optical device includes trenches positioned on opposing sides of a ridge. A plurality of electrical contacts are positioned in each trench.

An optical device 10 can include a plurality of attenuators positioned so as to attenuate a light signal traveling along a waveguide 14. FIG. 4 is a topview of an optical device 10 having a plurality of attenuators positioned along a waveguide 14. Each attenuator includes electrical contacts 26 and doped regions 24 (not shown) positioned on opposing sides of the waveguide 14. Electrical contacts 26 and doped regions 24 for different attenuators are positioned in the same trench 22. Placing a plurality of electrical contacts 26 in a single trench 22 reduces the number of trenches 22 with which the light signal interacts and accordingly reduces the optical loss associated with operating the attenuators in the pass mode.

Figure 5A:
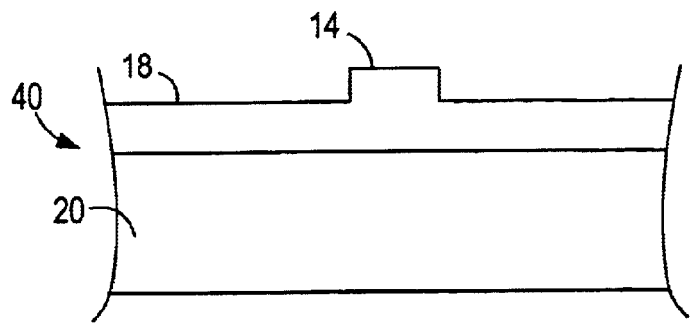
FIG. 5A through FIG. 5D illustrate a method of forming an optical device having an attenuator according to FIG. 1A and FIG. 1B.
Figure 5B:
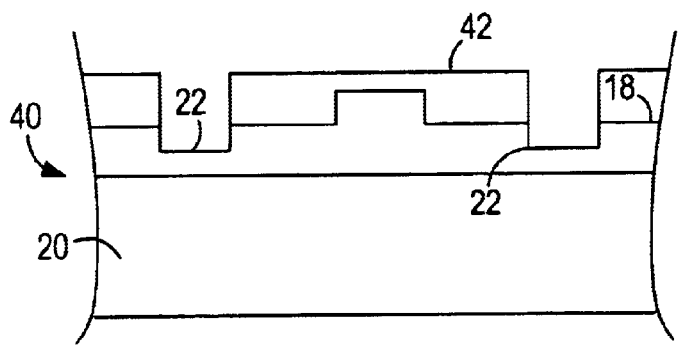
Figure 5C:
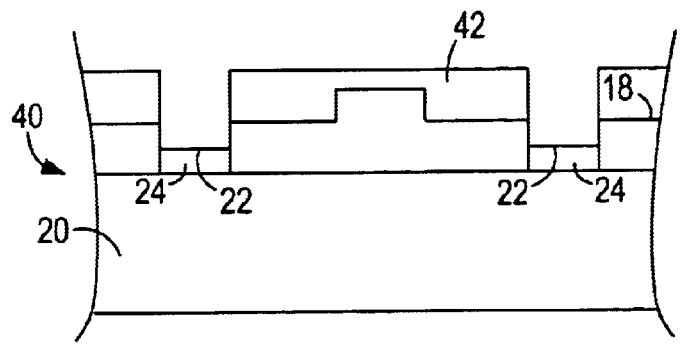
Figure 5D:
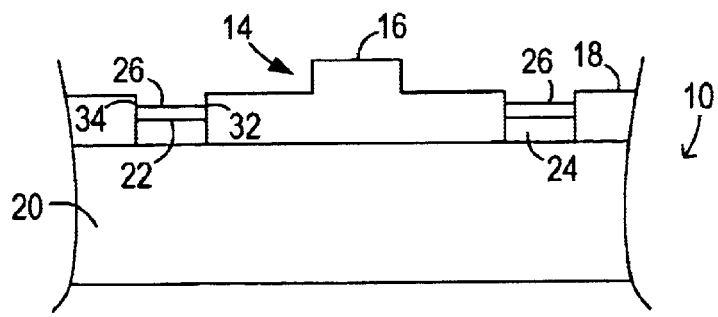

FIG. 5A though FIG. 5D illustrate a method of fabricating an optical device 10 having an attenuator. The method can be performed on a wafer having a light transmitting medium positioned on a base 20. An example of a suitable wafer includes, but is not limited to, a silicon-on-insulator wafer. The wafer is masked, a first etch performed and the mask removed so as to provide the device precursor 40 illustrated in FIG. 5A. The first mask is formed so as to protect the region of the device precursor 40 where the ridges 16 of the ridge waveguides 14 are to be formed on the device precursor 40.

A second mask 42 is formed on the device precursor 40 of FIG. 5A and a second etch performed to provide the device precursor 40 of FIG. 5B. A suitable second mask 42 includes, but is not limited to, a photoresist or an oxide. The second mask 42 is formed such that the regions where the trenches 22 are to be formed remain exposed and the surrounding regions are protected. Accordingly, the second mask 42 defines the shape of the trenches 22 on the device precursor 40. A second etch is performed so as to formed the trenches 22 to the desired depth.

The second mask 42 remains intact on the device precursor 40 and the doped regions 24 are formed so as to provide the device precursor 40 shown in FIG. 5C. Forming the doped regions 24 can include forming an additional mask (not shown) over the second mask 42. The additional mask is formed so as to protect the region(s) where the P type material is to be formed and the remaining exposed regions are doped with an N type impurity. The additional mask is removed and a second additional mask formed so as to protect the region(s) of the device precursor 40 where the N type material was formed and the exposed regions doped with a P type impurity. The second additional mask is then removed. A suitable first additional mask and a suitable second additional mask includes, but is not limited to, a photoresist or an oxide.

Although the region of N type material is described as being formed before the region of P type material, the order of impurity formation can be reversed. Further, other methods of forming the regions of N type material and P type material can be employed. For instance, the P type and N type material can be formed by impurity diffusion. Additionally, the regions of N type material can be formed by attaching a piece of N type material to the device precursor 40 at the location the region of N type material is desired. The regions of the P type material can be similarly formed. In some instances, the regions of N type material and/or P type material are formed to a concentration of 10^(117–21)/cm³ at a thickness of less than 13 µm, 2 µm, or 0.1 m.

The electrical contacts 26 are formed on the device precursor 40 of FIG. 5C and the second mask 42 removed to provide the optical device 10 illustrated in FIG. 5D. A suitable electrical contact 26 includes, but is not limited to, a metal layer. A metal layer can be formed on the device precursor 40 using techniques commonly employed in integrated circuit manufacturing processes.

Although the trenches are shown as being substantially mirror image of one another, the trenches need not be mirror images of one another. For instance, one trench can longer than the other, the trenches can employ different tapers, one trench may not have tapers and/or the active sides of the trenches may have different distances from the ridge waveguide.

Although the electrical contacts are shown as being positioned on opposing sides of the waveguide, the electrical contacts can be positioned on one side of a waveguide.

The optical attenuators described above can be employed for purposes other than attenuation. For instance, the attenuators can be employed for modulation of light signals.

Other embodiments, combinations and modifications of this invention will occur readily to those of ordinary skill in the art in view of these teachings.

Therefore, this invention is to be limited only by the following claims, which include all such embodiments and modifications when viewed in conjunction with the above specification and accompanying drawings.

What is claimed is:

1. An optical device, comprising:
    a ridge waveguide defined by a ridge extending from a slab of a light transmitting medium;
    trenches extending into the slab of light transmitting medium and being positioned on opposing sides of the ridge, at least one of the trenches being associated with a trench displacement tapering from a first displacement to a second displacement, the trench displacement being a distance between the ridge and a side of a trench closest to the ridge; and
    at least one electrical contact positioned in at least one of the trenches.

2. The optical device of claim 1, wherein each of the trenches is associated with a trench displacement that tapers from a first displacement to a second displacement.

3. The optical device of claim 1, wherein at least one electrical contact is positioned in each trench.

4. The optical device of claim 1, wherein a plurality of electrical contacts are positioned in at least one trench.

5. The optical device of claim 1, wherein the at least one electrical contact is positioned over a region of the light transmitting medium doped with an impurity.

6. The optical device of claim 1, wherein a length of at least one trench has a trench displacement that is substantially constant and the at least one electrical contact is positioned along the length of the at least one trench.

7. The optical device of claim 1, wherein the trench displacement tapers from an end of the trench to the second displacement.

8. The optical device of claim 7, wherein the trench displacement expands from the second displacement to a second end of the trench.

9. The optical device of claim 7, wherein a ratio of the trench displacement at the end of the trench to the second trench displacement is greater than 1.1.

10. The optical device of claim 7, wherein the trench displacement at the end of the trench is greater than 6 $\mu$m.

11. The optical device of claim 1, wherein the dimensions of the waveguuide change in association with the waveguide passing the trenches.

12. The optical device of claim 11, wherein a width of the waveguide expands before the waveguide passes one or more electrical contacts.

13. The optical device of claim 11, wherein at least one doped region is positioned in the bottom of a trench and wherein a width of the waveguide expands before the waveguide passes one or more of the doped regions.

14. The optical device of claim 11, wherein a width of the waveguide expands such that at least a portion of the expansion is between the trenches.

15. The optical device of claim 11, wherein a width of the waveguide expands such that the entire expansion is outside of a region extending between the trenches.

16. An optical device, comprising:
    a ridge waveguide defined by a ridge extending from a slab of a light transmitting medium;
    trenches extending into the slab of light transmitting medium and being positioned on opposing sides of the ridge; and
    a plurality of electrical contacts positioned in each trench.

17. The optical device of claim 16, wherein the at least one electrical contact is positioned over a region of the light transmitting medium doped with an impurity.

18. The optical device of claim 16, wherein at least one of the trenches is associated with a trench displacement that tapers from a first displacement to a second displacement, the trench displacement being a distance between the ridge and a side of a trench closest to the ridge.

19. The optical device of claim 18, wherein a straight length of at least one trench has a trench displacement that is substantially constant and the at least one electrical contact is positioned along the straight length of the at least one trench, the trench displacement being a distance between the ridge and a side of a trench closest to the ridge.

20. The optical device of claim 18, wherein the trench displacement tapers from an end of the trench to the second displacement.

21. The optical device of claim 16, wherein a ratio of the trench displacement at the end of the trench to the second trench displacement is greater than 1.1.

22. The optical device of claim 16, wherein the dimensions of the waveguuide change in association with the waveguide passing the trenches.

23. The optical device of claim 22, wherein a width of the waveguide expands before the waveguide passes one or more electrical contacts.

24. A method of forming an optical device having an optical device, comprising:
    forming a ridge extending from a slab of a light transmitting medium, the ridge being configured to serve as a ridge waveguide;
    forming trenches extending into the slab of light transmitting medium on opposing sides of the ridge, at least one of the trenches being associated with a trench displacement tapering from a first displacement to a second displacement, the trench displacement being a distance between the ridge and a side of a trench closest to the ridge; and
    forming at least one electrical contact in at least one of the trenches.

25. The method of claim 24, wherein each of the trenches is associated with a trench displacement that tapers from a first displacement to a second displacement.

26. The method of claim 24, further comprising:
    forming at least one doped region in the bottom of at least one trench before forming the electrical contacts and wherein at least one of the electrical contacts is formed over a doped region.

27. A method of forming an optical device having an optical optical device, comprising:
    forming a ridge extending from a slab of a light transmitting medium, the ridge being configured to serve as a waveguide;
    forming trenches extending into the slab of light transmitting medium and being positioned on opposing sides of the ridge; and
    forming a plurality of electrical contacts in each trench.

* * * * *